(12) United States Patent
Kirk et al.

(10) Patent No.: US 12,006,054 B2
(45) Date of Patent: Jun. 11, 2024

(54) AIRCRAFT NACELLE INLET

(71) Applicant: Safran Nacelles Limited, Burnley (GB)

(72) Inventors: David Kirk, Rowenstall (GB); Graeme Hill, Higherford (GB); David Hebden, Limecroft (GB); Simon Furmston, Blacko (GB)

(73) Assignee: Safran Nacelles Limited (GB)

( * ) Notice: Subject to any disclaimer, the term of this patent is extended or adjusted under 35 U.S.C. 154(b) by 1 day.

(21) Appl. No.: 17/766,852

(22) PCT Filed: Oct. 14, 2020

(86) PCT No.: PCT/GB2020/052554
§ 371 (c)(1),
(2) Date: Apr. 6, 2022

(87) PCT Pub. No.: WO2021/074609
PCT Pub. Date: Apr. 22, 2021

(65) Prior Publication Data
US 2023/0202666 A1    Jun. 29, 2023

(30) Foreign Application Priority Data

Oct. 15, 2019 (GB) ..................................... 1914916

(51) Int. Cl.
*B64D 33/02* (2006.01)
*B64D 29/00* (2006.01)

(52) U.S. Cl.
CPC ............. *B64D 33/02* (2013.01); *B64D 29/00* (2013.01); *B64D 2033/0206* (2013.01)

(58) Field of Classification Search
None
See application file for complete search history.

(56) References Cited

U.S. PATENT DOCUMENTS 3,933,327 A * 1/1976 Cook ..................... B64D 15/04
244/134 B
4,738,416 A * 4/1988 Birbragher ............. B64D 15/04
244/134 B
(Continued)

FOREIGN PATENT DOCUMENTS

EP    2241504 A2    10/2010
FR    2924409 A1    6/2009
(Continued)

OTHER PUBLICATIONS

Great Britain Search Report for Great Britain Application No. 1906537.4, dated Oct. 18, 2019, 8 pages.
(Continued)

*Primary Examiner* — Kayla Mccaffrey
(74) *Attorney, Agent, or Firm* — Buchanan Ingersoll & Rooney PC (57) ABSTRACT

An aircraft nacelle air inlet comprising: a lip skin defining a curved surface of the inlet, the curved surface extending about a longitudinal axis of the inlet; a forward bulkhead; an inner barrel having a radially inner surface defining a surface of the inlet, a radially outer surface, and a sound attenuating layer arranged between the radially inner and radially outer surfaces; and a joining frame fixed to the lip skin and/or to the forward bulkhead. A first portion of the joining frame extends over at least a portion of the sound attenuating layer of the inner barrel and is fixed to the radially outer surface of the inner barrel.

15 Claims, 10 Drawing Sheets

(56) References Cited

U.S. PATENT DOCUMENTS

| | | | |
|---|---|---|---|
| 6,123,170 A * | 9/2000 | Porte | B64D 33/02 239/265.17 |
| 6,129,311 A | 10/2000 | Welch et al. | |
| 7,938,224 B2 | 5/2011 | Frustie et al. | |
| 8,602,360 B2 | 12/2013 | Porte et al. | |
| 8,800,714 B2 | 8/2014 | Ichihashi | |
| 9,010,084 B2 * | 4/2015 | Chelin | B64D 15/04 244/54 |
| 9,168,716 B2 | 10/2015 | Benedetti et al. | |
| 9,352,844 B2 | 5/2016 | Porte et al. | |
| 9,779,715 B1 | 10/2017 | Seldal | |
| 9,927,374 B2 | 3/2018 | Safai et al. | |
| 11,325,717 B2 * | 5/2022 | Porte | B64D 29/00 |
| 11,649,062 B2 * | 5/2023 | Porte | B64D 29/02 181/214 |
| 2008/0206044 A1 | 8/2008 | Porte et al. | |
| 2009/0101756 A1 | 4/2009 | Cacciaguerra | |
| 2010/0038475 A1 | 2/2010 | Zecca et al. | |
| 2010/0122868 A1 | 5/2010 | Chiou et al. | |
| 2012/0048389 A1 | 3/2012 | Chelin et al. | |
| 2012/0261521 A1 * | 10/2012 | Porte | B64D 29/00 244/53 B |
| 2014/0001284 A1 | 1/2014 | Porte et al. | |
| 2014/0077031 A1 | 3/2014 | Benedetti et al. | |
| 2014/0326536 A1 | 11/2014 | Vauchel et al. | |
| 2018/0297304 A1 | 10/2018 | Weaver et al. | |

FOREIGN PATENT DOCUMENTS

| | | |
|---|---|---|
| FR | 2954282 A1 | 6/2011 |
| FR | 3055612 A1 | 3/2018 |

OTHER PUBLICATIONS

Great Britain Search Report for Great Britain Application No. 1914916.0, dated Aug. 7, 2020, 10 pages.

International Search Report and Written Opinion for International Application No. PCT/GB2020/051121, dated Jul. 24, 2020, 9 pages.

International Search Report and Written Opinion for International Application No. PCT/GB2020/052554, dated Aug. 12, 2020, 8 pages.

Entire patent prosecution history of U.S. Appl. No. 17/608,819, filed Nov. 4, 2021, entitled, "Acoustic Panel".

* cited by examiner

AIRCRAFT NACELLE INLET

This application is a U.S. National Phase application of PCT International Application No. PCT/GB2020/052554, filed Oct. 14, 2020, which claims the benefit of GB 1914916.0, filed Oct. 15, 2019, both of which are incorporated by reference herein.

FIELD OF THE INVENTION

This invention relates to an aircraft nacelle inlet and an aircraft nacelle incorporating such an inlet.

BACKGROUND OF THE INVENTION

There is a desire to isolate sounds in one section of an aircraft from other sections of the aircraft and/or the outside of the aircraft. This is particularly important for an aircraft nacelle, and even more particularly for the inlet thereof, where noise generated by the engine and by airflow at the intake to the engine should be contained or attenuated in order to avoid excessive noise pollution.

Conventional sound attenuation is provided by sound attenuation layers, which may be non-structural layers. Known aircraft nacelle inlet design requires a junction between a lip skin, a forward bulkhead and an inner barrel assembly (known as an A0 junction), which is formed as two separate joints, with the joint between the forward bulkhead and lip skin being separate from the joint between the lip skin and the inner barrel.

Known A0 junctions suffer from a large area which has no sound attenuating layer or a sound attenuating layer which is tapered to a reduced thickness, which may be referred to as not acoustically treated, and may thereby allow excess noise to escape from an air inlet of a nacelle.

SUMMARY OF THE INVENTION

This invention enables the area which can be acoustically treated between the lip skin and the acoustically treated inner barrel to be improved and may thereby reduce the amount of noise leaving the nacelle.

According to a first aspect of the invention there is provided an aircraft nacelle inlet comprising: a lip skin defining a curved surface of the inlet, the curved surface extending about a longitudinal axis of the inlet; a forward bulkhead; an inner barrel having a radially inner surface defining a surface of the inlet, a radially outer surface, and a sound attenuating layer arranged between the radially inner and radially outer surfaces; and a joining frame fixed to the lip skin and/or to the forward bulkhead; wherein a first portion of the joining frame extends over at least a portion of the sound attenuating layer of the inner barrel and is fixed to the radially outer surface of the inner barrel.

With such an arrangement, a sound attenuating layer of the inner barrel may extend further forward, and/or may not be tapered. Therefore, the acoustically treatable area may be increased. In particular, providing a joining frame that extends over at least a portion of the sound attenuating layer of the inner barrel provides a strong mounting point to the acoustically treated inner barrel. This means that the sound attenuating layer between the radially inner and outer surfaces of the inner barrel need not be tapered to create a strong mounting point on the inner barrel, as is often necessary using a conventional A0 junction. In this way, the acoustically treated area of the inner barrel is increased and noise pollution may be reduced.

Additionally, or alternatively, by mounting the forward bulkhead to the inner barrel via the joining frame, the inner barrel, and therefore also the sound attenuating layer, can be extended forward. This increases the acoustically treated area of the inner barrel.

The lip skin and the bulkhead may together define a compartment. The compartment may be used to provide an anti-icing function for the air inlet of the nacelle by allowing hot gases to vent out forward of the A0 junction and therefore prevent build-up of ice on a radially inner surface of the inlet.

The inner barrel may have an end surface substantially perpendicular to the radially outer surface and/or the radially inner surface of the inner barrel. Such an inner barrel with a squared-off end surface may increase the acoustically treated area of the inner barrel and therefore improve acoustic attenuation as there may be no tapering of the thickness of the acoustic attenuation layer.

The joining frame may further comprise a second portion and the second portion of the joining frame may extend over the end surface of the inner barrel and may thereby provide a strong connection between the inner barrel and the lip skin, optionally between a radially outer surface of the inner barrel and the lip skin.

The joining frame may further comprise a third portion and the third portion of the joining frame may extend over or overlap at least a portion of the forward bulkhead. Such an arrangement may improve the transfer of loads from the forward bulkhead to the inner barrel and may provide a more secure connection.

The joining frame may further comprise a fourth portion, the fourth portion being a curved surface of the joining frame, designated as the joining frame curved surface hereon, arranged to overlap the lip skin. Such an arrangement may provide a stronger joint between the joining frame and the lip skin.

The joining frame may comprise, for instance, the first portion and the fourth portion without necessarily also comprising the second and/or third portion. Equally, the joining frame may comprise, for instance, the first portion and the third portion without necessarily also comprising the second portion. The presence of a third or fourth portion does not necessitate the presence of a second or third portion respectively.

The lip skin may have a flat surface extending radially outwardly from the curved surface defined by the lip skin and at least a portion of the flat surface of the lip skin may overlap the joining frame, optionally the second portion of the joining frame. With such an arrangement, load may be transferred from the lip skin through the joining frame and into the radially outer surface of the inner barrel. Such an arrangement allows an additional acoustic treatment to be applied to the lip skin. Mounting the flat surface of the lip skin to the joining frame may enable the space between the lip skin and the acoustically treated area of the inner barrel to be reduced.

The first portion of the joining frame may be formed integrally with the second, third, and/or fourth portions. Such an arrangement may improve the strength of the joining frame.

The lip skin may comprise a structural sheet defining the lip skin curved surface and a lip skin sound attenuating layer arranged on a radially outer side of the structural sheet. With such an arrangement, additional sound attenuation may be provided forward of the inner barrel.

The lip skin may further comprise a further structural sheet on a radially outer surface of the lip skin sound attenuating layer, the further structural sheet being fixed to the joining frame. Such an arrangement may provide improved strength of the lip skin and protection to the sound attenuating sheet.

The aircraft nacelle may further comprise a second joining frame, the second joining frame being coupled to the further structural sheet and to the structural sheet of the lip skin. Such an arrangement may reduce any prospect of separation of the layers on the lip skin. This arrangement may also improve the stress resistance of the lip skin portion including the additional acoustic treatment.

The joining frame and/or the second joining frame may be annular. The joining frame and/or second joining frame may be formed of multiple parts, each part being a sector of an annulus, optionally two semi-annular parts. This may provide a more easily assembled arrangement.

The aircraft nacelle may further comprise ventilation holes through a skin of the nacelle forward of the joining frame. These may provide an anti-icing function to the inlet.

The inner barrel may comprise a radially inner structural sheet defining the radially inner surface and a radially outer structural sheet defining the radially outer surface, the sound attenuating layer being disposed between the radially inner and radially outer structural sheets. With such an arrangement, the strength of the inner barrel may be improved.

According to a second aspect of the invention, there is provided a nacelle including an air inlet according to any aspect described above.

BRIEF DESCRIPTION OF THE DRAWINGS

Embodiments of the invention will now be described with reference to the accompanying drawings, in which.

DETAILED DESCRIPTION OF EMBODIMENTS

Figure 1:
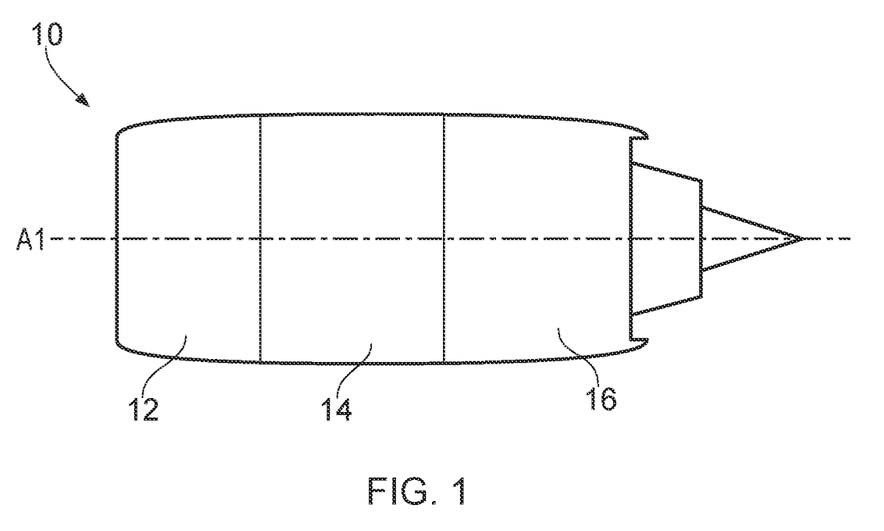
FIG. 1 shows an aircraft nacelle.

FIG. 1 shows an aircraft nacelle 10, the nacelle exterior being formed of three primary parts: an air intake 12, which may also be referred to as an air inlet 12, a fan casing 14 and a thrust reverser 16. The purpose of the air intake 12, which may be referred to as an inlet cowling, is to direct airflow into the fan and into the engine and to create an aerosmooth surface for airflow over the exterior of the aircraft nacelle 10. The airflow into the inlet cowling 12 generates a significant amount of noise, and so the inlet cowling 12 should function to attenuate the noise and prevent excessive noise pollution outside of the aircraft.

As shown in FIG. 1, the nacelle may have a longitudinal axis A1 extending through the nacelle. The longitudinal axis A1 may be generally aligned with an intended direction of motion of the nacelle. The term radial direction as used herein is defined relative to the longitudinal axis A1, with radially inner areas being closer to the longitudinal axis A1 and radially outer areas being further from the longitudinal axis A1. The longitudinal axis A1 may equally be regarded as the longitudinal axis of the air intake 12.

Figure 2:
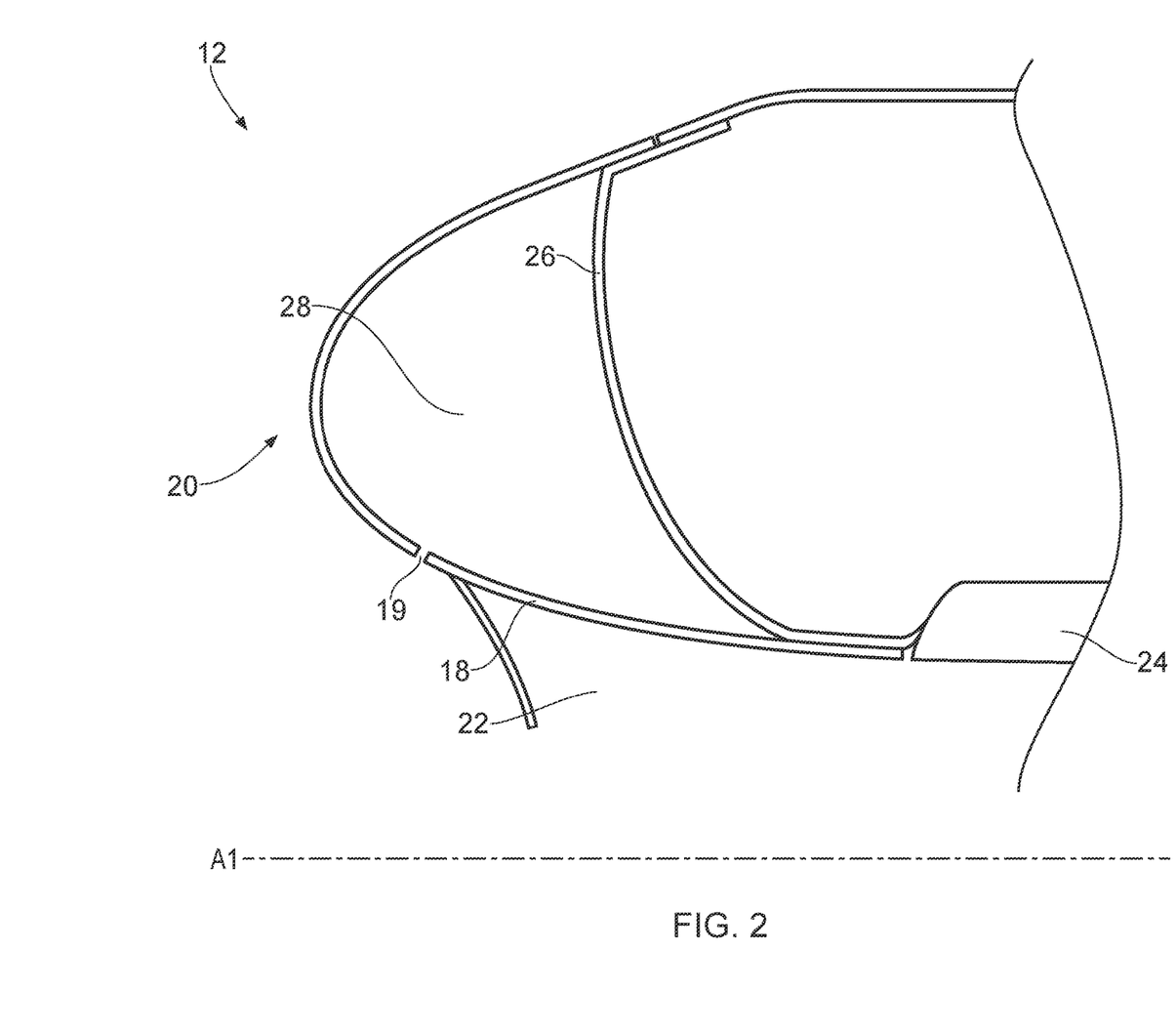
FIG. 2 shows a cross-section of an air inlet of a nacelle.

FIG. 2 shows a cross-section of a portion of the air intake 12. The air intake 12 comprises a lip skin 18 that forms an air intake lip 20 that extends around the circumference of the nacelle and forms the leading edge of the nacelle. The lip skin 18 has a curved surface 22 that extends circumferentially about the longitudinal axis A1 of the nacelle, defining a radially inner surface of the lip 20. In this way, the most forward portion of the inner surface of the annular inlet to the nacelle is defined by the curved surface 22 of lip skin 18.

The air intake 12 of FIG. 2 also comprises an inner barrel 24. A radially inner surface of inner barrel 24 is aligned with the curved surface 22 of lip skin 18, such that the lip skin curved surface 22 and the radially inner surface of inner barrel 24 create an aerosmooth surface for airflow into the nacelle. In this way, an upstream portion of the inlet to the nacelle is defined by the curved surface 22 of the lip skin 18, and a downstream portion of the inlet to the nacelle is defined by the radially inner surface of the inner barrel 24. At an aft end of the inner barrel 24, the inner barrel 24 is connected to fan casing 14.

The inner barrel 24 is acoustically treated in that the inner barrel 24 comprises a sound attenuating layer, which may be a honeycomb sheet or a different low density material, such as a cellular foam or sponge. The sound attenuating layer is arranged between the radially inner and outer surfaces of the inner barrel 24.

As shown in FIG. 2, air intake 12 also comprises a forward bulkhead 26 extending across the interior of the air intake lip 20, such that the lip skin 18 and the forward bulkhead together define a compartment 28. The compartment 28 may contain hot gas, or a duct for delivering hot gas, and may have ventilation holes 19, disposed on a radially inner side of the leading edge of the nacelle 10, arranged to exhaust hot gas, which may pass over a radially inner surface of the inlet 12 in order to prevent build-up of ice on the surface of the nacelle.

Figure 3:
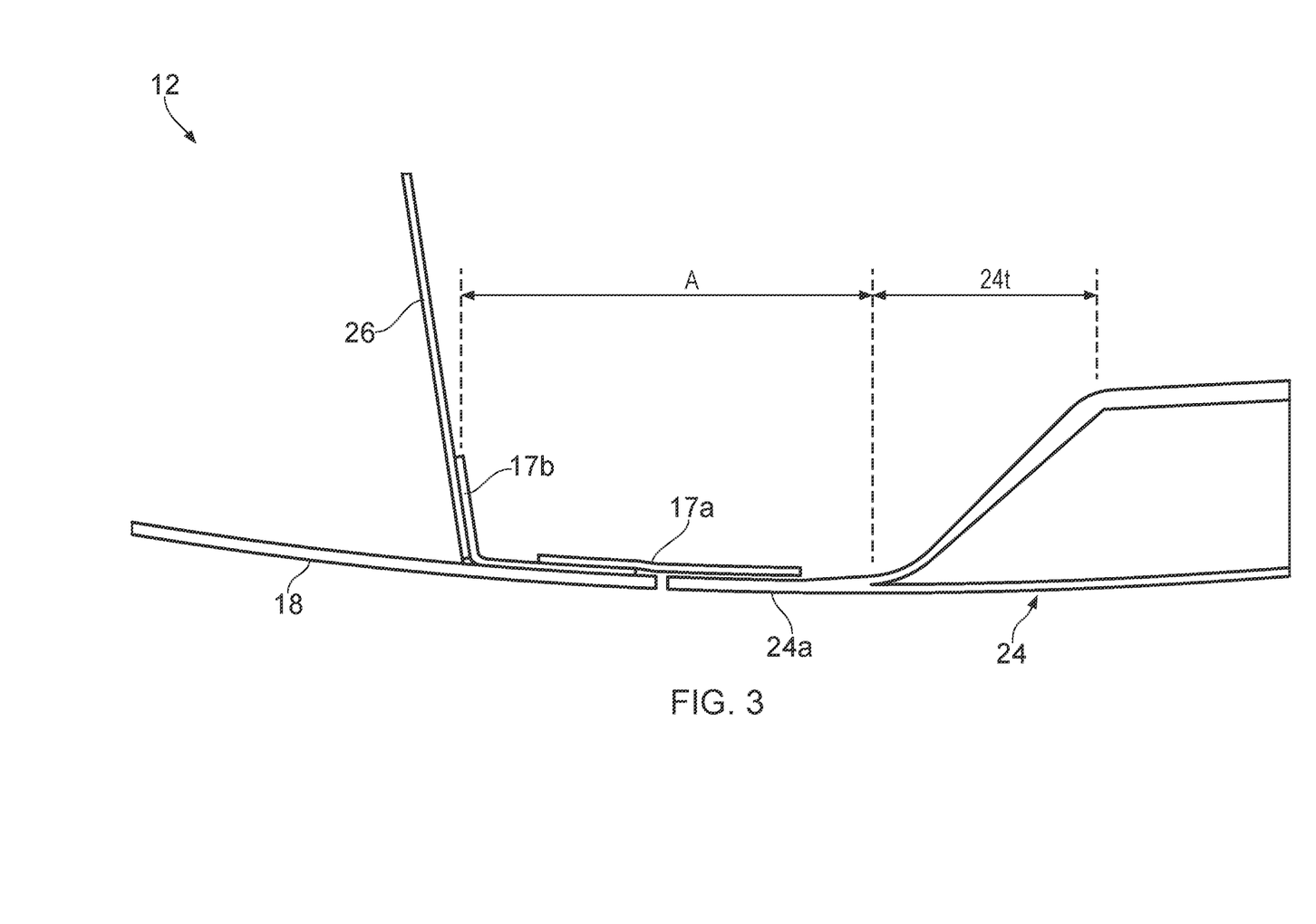
FIG. 3 shows a cross-section of a known junction between the lip skin, forward bulkhead and inner barrel.

FIG. 3 shows in more detail a cross-section of a known junction between the lip skin 18, the inner barrel 24 and the forward bulkhead 26 of the nacelle intake 12 (this region being known as an A0 junction). In this design the forward bulkhead 26 is connected directly to the lip skin 18 and, in a separate connection, the lip skin 18 is connected to the inner barrel 24. The lip skin 18 may be connected to the inner barrel 24 at a thin portion of the inner barrel 24a via a first joining plate 17a and the forward bulkhead 26 may be connected to the lip skin 18 via a second joining plate 17b. The first joining plate 17a, which connects the inner barrel 24 and the lip skin 18, may be mounted over the second joining plate 17b, as shown in FIG. 3.

As shown in FIG. 3, this requires a tapered portion 24t of the inner barrel 24, for transitioning from a thick portion having a sound attenuating layer to a thinner region 24a. This results in an area that cannot be acoustically treated as the tapered portion 24t may have sub-optimal sound attenuation due to having a thinner sound attenuating layer. Additionally, the first and second joining plates 17a, 17b cannot be easily attached to sound attenuating sheets, which results in an area A that is not acoustically treated.

Figure 4:
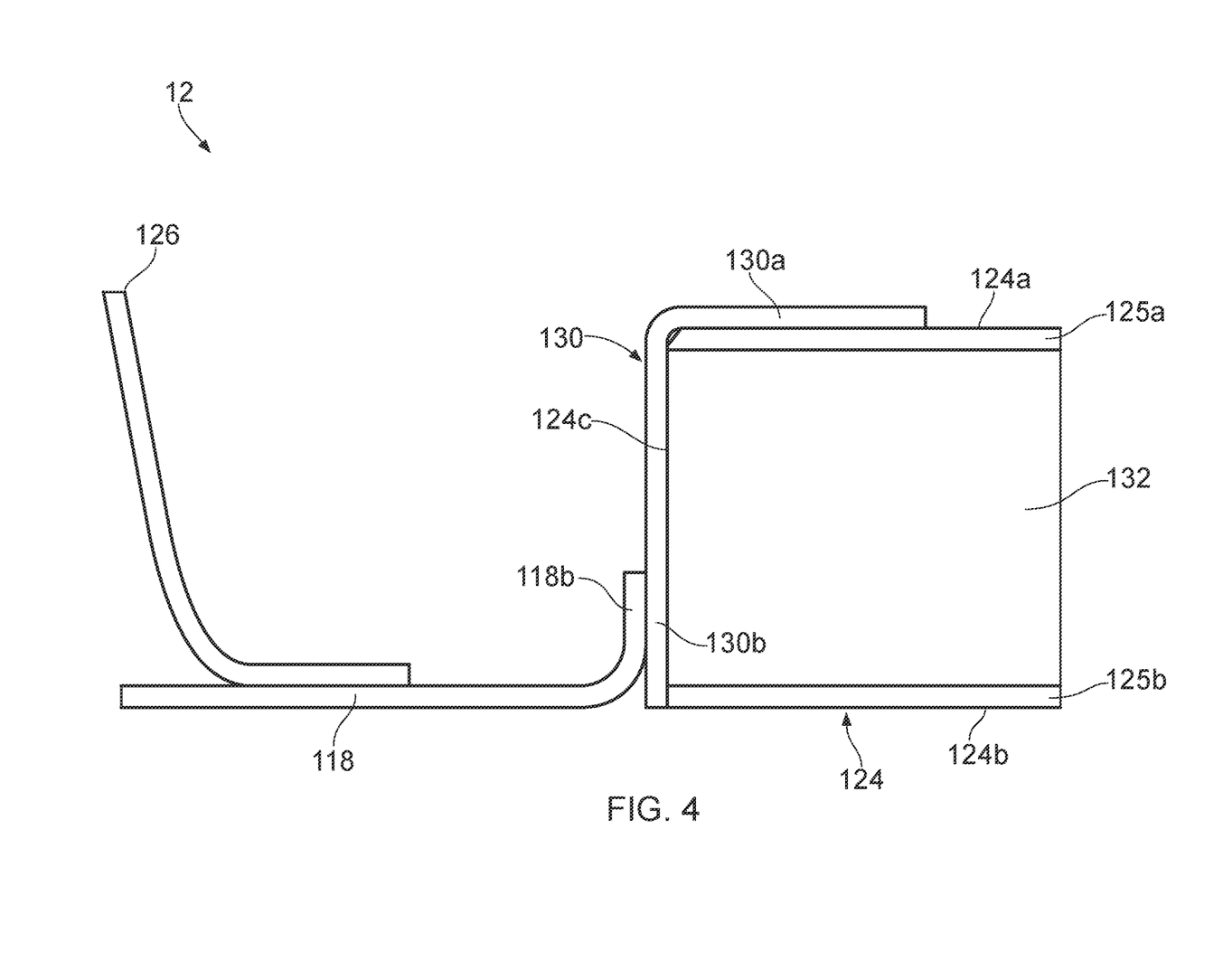
FIG. 4 shows a cross-section of an air inlet according to an embodiment of the invention.

A first embodiment of the invention is shown in cross-section in FIG. 4. Here, the lip skin 118 is connected to the inner barrel 124 via a joining frame 130. The inner barrel 124 has a radially outer surface 124a, which is defined by a radially outer structural sheet 125a and a radially inner surface 124b, which is defined by a radially inner structural sheet 125b. The structural sheets 125a, 125b may each be a composite sheet or a metallic sheet such as aluminium. A sound attenuating sheet 132 may be positioned between the structural sheets 125a and 125b. The radially inner sheet 125b may have holes so that sound waves from the inlet 12 can enter and be absorbed by the sound attenuating sheet 132. For this reason, a greater force may be carried by the radially outer structural sheet 125a.

A first portion 130a of the joining frame extends over and is fixed to the radially outer surface 124a of the inner barrel 124 and in particular to the radially outer sheet 125a, such that the first portion 130a extends at least partially over the sound attenuating layer 132 that is positioned between the radially inner 125b and radially outer sheet 125a of the inner barrel 124. The inner barrel 124 extends aft of the joining frame 130.

A second portion 130b of the joining frame 130 extends over a forward surface 124c of the inner barrel 124, the forward surface 124c, which may also be referred to as an end surface, is an annular surface substantially perpendicular to the radially inner and radially outer surfaces 124a, b.

The second portion 130b of the joining frame 130 is fixed to the lip skin 118 and in particular to a radially extending annular surface 118b of the lip skin 118. The overlapping portions of the joining frame 130 and the lip skin 118 may provide a strong joint between the lip skin 118 and the inner barrel 130.

In contrast to the known arrangement shown in FIG. 3, the thickness of the sound attenuating layer 132 at the end surface 124c, and thus the distance between radially outer and radially inner sheets 125a, b at end surface 124c, may be the same as that of the rest of the inner barrel 124 (i.e. the inner barrel thickness is not tapered towards the end surface). As explained above, this means that the loss of acoustic attenuation towards end surface 124c may be reduced.

The second portion 130b of the joining frame 130 may be substantially perpendicular to the first portion 130a, and may define a flat surface extending radially outwardly from the curved surfaces 124a, b of the inner barrel 124. In this embodiment, the forward bulkhead 126 may be fixed to the lip skin 118 as in known arrangements.

Figure 5:
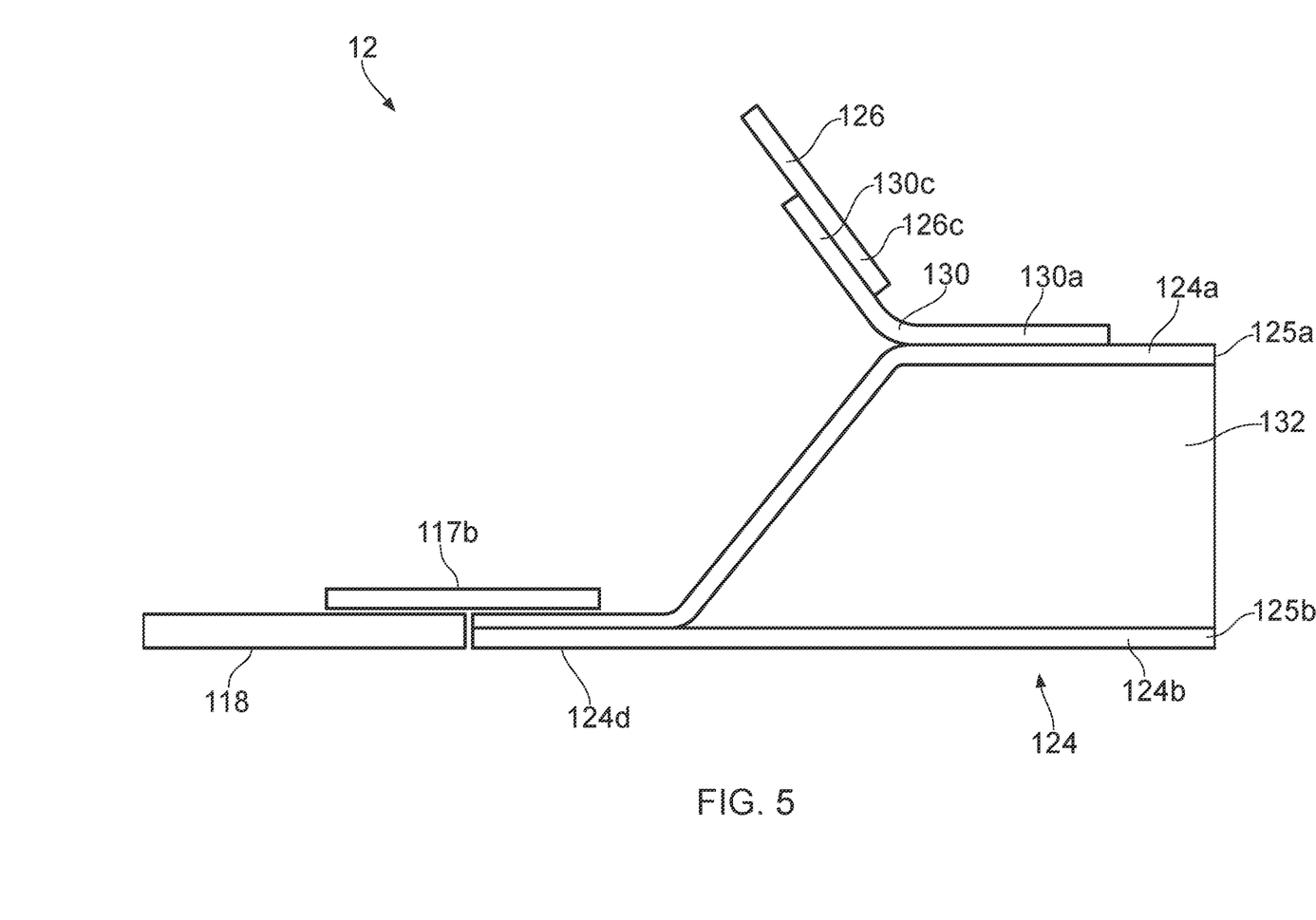
FIG. 5 shows a cross-section of an air inlet according to an embodiment of the invention.

A second embodiment of the invention is shown in FIG. 5. FIG. 5 illustrates a cross-section of the connection between the forward bulkhead 126 and the inner barrel 124 via the joining frame 130. A first portion 130a of the joining frame is fixed to the radially outer surface 124a of the inner barrel 124 in the manner described above in reference to FIG. 4 (i.e. with the first portion 130a extending at least partially over the sound attenuating layer 132). A third portion 130c of the joining frame 130 may overlap and be fixed to at least a portion 126c of the forward bulkhead 126.

In this embodiment, the inner barrel 124 may comprise a tapered portion, ending in a thin portion 124d, which may be connected to the lip skin 118 via a joining plate 117b as in known arrangements. However, in this arrangement, the inner barrel 124 may have a substantially constant thickness from the fan casing 14 to the forward bulkhead 126 and may therefore provide improved sound attenuation.

Figure 6:
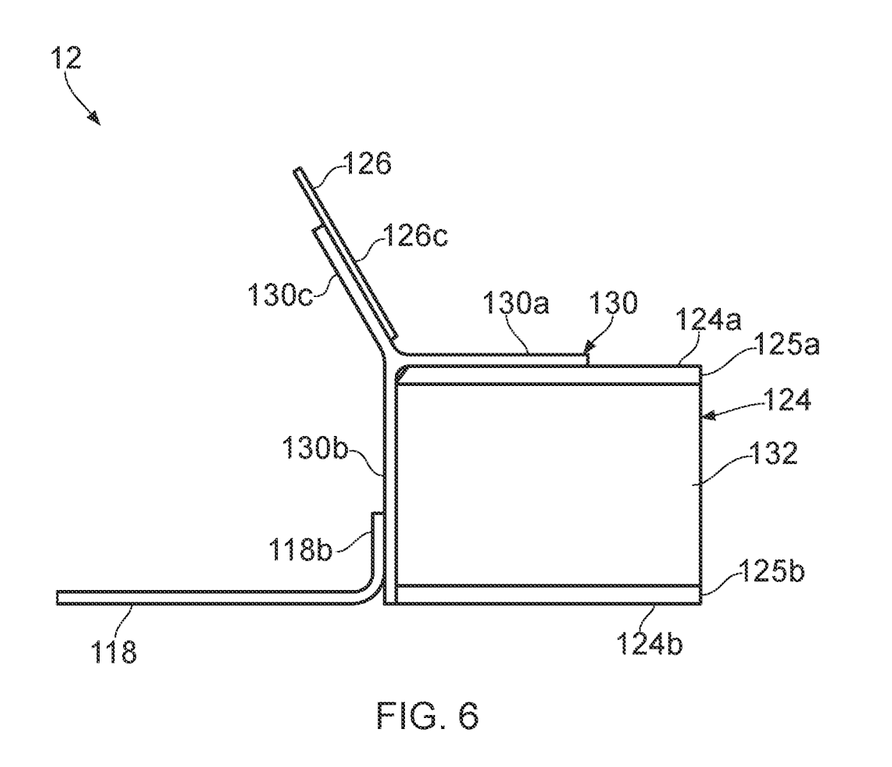
FIG. 6 shows a cross-section of an air inlet according to an embodiment of the invention.

A third embodiment of the invention is shown in FIG. 6. FIG. 6 illustrates a cross-section of an integrated A0 junction between the inner barrel 124, the lip skin 118 and the forward bulkhead 126, via an integral joining frame 130. FIG. 6 comprises aspects of the embodiments described above with reference to FIGS. 4 and 5. The lip skin-to-inner barrel connection may be the same as that described in reference to FIG. 4, and the forward bulkhead-to-inner barrel connection may be the same as that described in reference to FIG. 5.

By integrating aspects of both of the embodiments of FIGS. 5 and 6, a greater sound attenuation may be achieved and the integral joining frame 130, where the first, second and third portions 130a, 130b, 130c are all formed as a single piece, may provide improved strength and/or reduced weight. The joining frame may also be comprised of multiple pieces to aid assembly, with each piece defining a part of the joining frame 130, such as a sector of an annulus, each annular sector may comprise integrally formed first, second and third portions 130a, 130b, 130c. In this way, the first, second and third portions 130a, 130b, 130c of each piece of the joining frame 130 may be formed together as a single piece.

Figure 7:
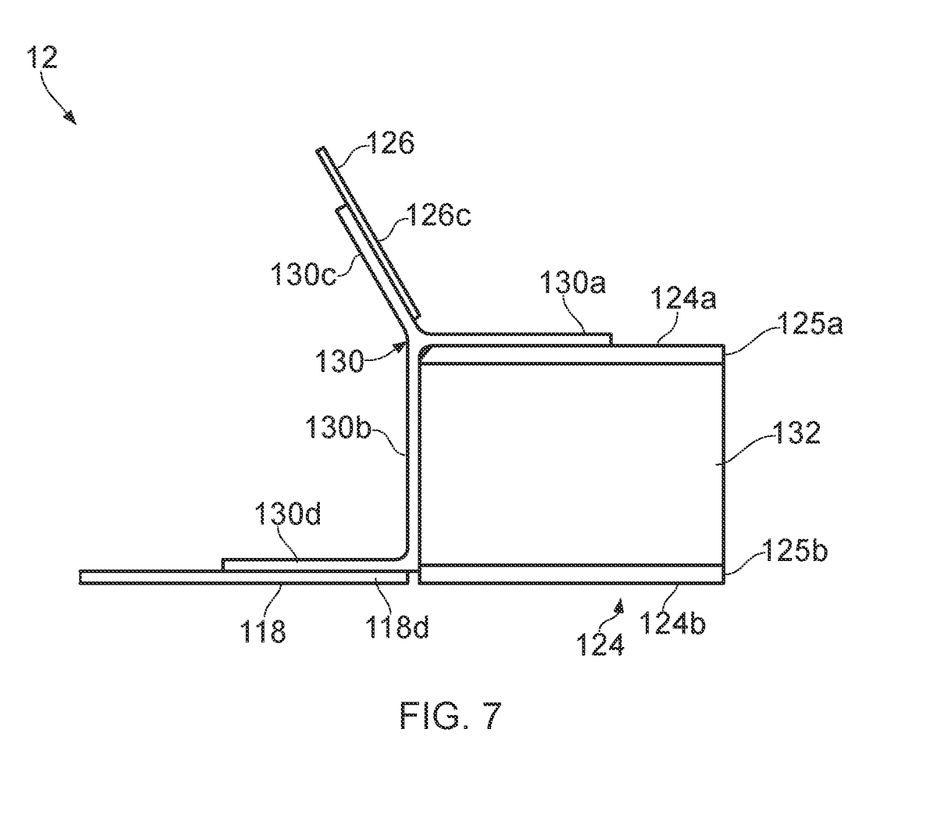
FIG. 7 shows a cross-section of an air inlet according to an embodiment of the invention.

FIG. 7 shows a cross-section of a fourth embodiment, incorporating an alternative connection between the lip skin 118 and the inner barrel 124 via the joining frame 130. Here, the joining frame 130 comprises a fourth portion 130d arranged to overlap a portion 118d of the lip skin 118. The fourth portion 130d of the joining frame 130 has a joining frame curved surface having a shape arranged to extend over the curvature of the lip skin 118. The fourth portion 130d may be substantially parallel to the inner and/or outer surfaces 124a, 124b of the inner barrel 124 and/or to the first portion 130a of the joining frame 130. The fourth portion 130d may extend from the second portion 130b substantially perpendicularly. The fourth portion 130d may be integrally formed with the first, second, and/or third portions 130a, 130b, 130c in the same way as set our above in respect of FIGS. 5 and 6.

Figure 8:
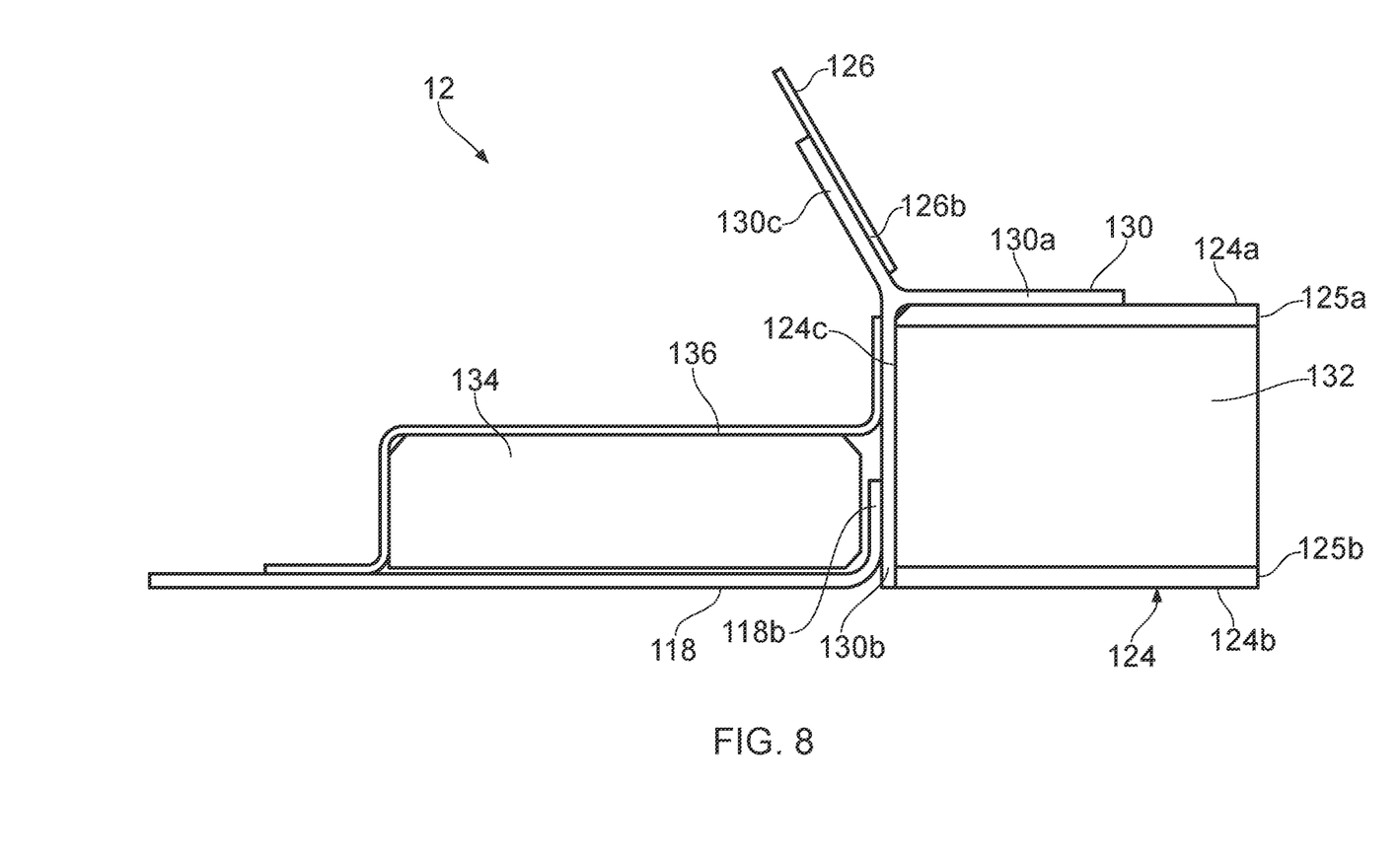
FIG. 8 shows a cross-section of an air inlet according to an embodiment of the invention.

FIG. 8 shows a fifth embodiment, substantially similar to the embodiment of FIG. 6, incorporating a lip skin sound attenuating layer 134, which may further reduce noise escaping from the inlet 12. The lip skin sound attenuating layer 134 may be on a radially outer side of the lip skin 118, which may be a structural sheet. An additional structural sheet 136 may be provided over the lip skin sound attenuating layer 134. The additional structural sheet 136 may be fixed to the joining frame 130 and to the lip skin 118 at a location forward of the lip skin sound attenuating sheet 134, as illustrated in FIG. 8.

In order to allow sound waves to enter the lip skin sound attenuating layer 134, at least a portion of the lip skin 118 may be perforated similarly to the radially inner structural sheet 125b of the inner barrel 124 and a significant portion of the structural strength of the lip skin may be provided by the additional structural sheet 136.

Figure 9:
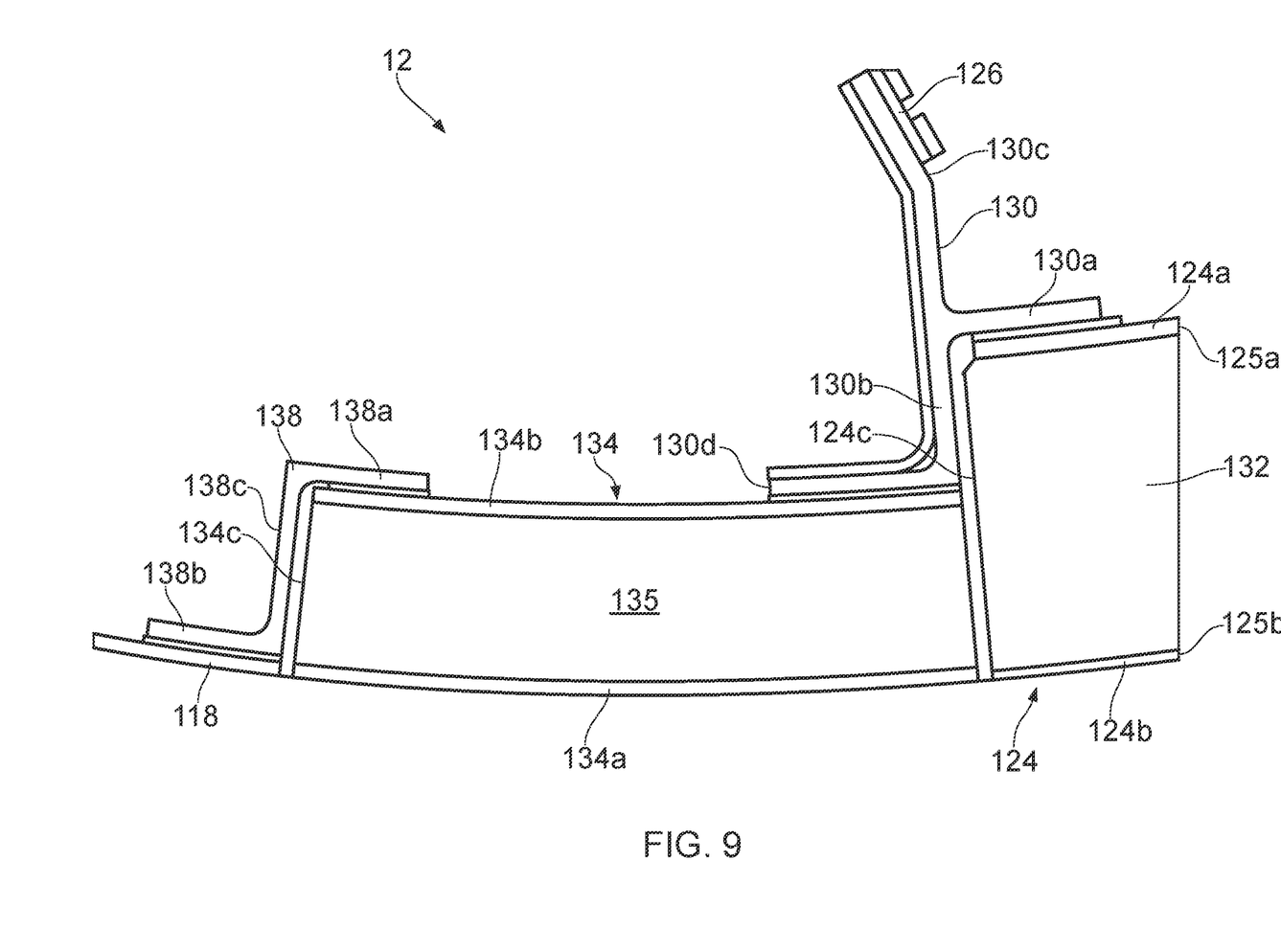
FIG. 9 shows a cross-section of an air inlet according to an embodiment of the invention.

FIG. 9 shows a cross-section of a sixth embodiment. In FIG. 9, the lip skin provides an acoustic treatment section 134, which comprises a radially inner structural sheet 134a, a radially outer structural sheet 134b and a sound attenuating layer 135 between the radially inner and outer structural sheets 134a, 134b. The inner structural sheet 134a may have holes in order to allow sound waves to enter the lip skin sound attenuating sheet 135 and thereby be absorbed. The fourth portion 130d of the joining frame 130 overlaps and is fixed to the radially outer structural sheet 134b, which extends over the lip skin sound attenuating layer 135. In this arrangement, the second portion 130b of the joining frame 130 extends only partially over the end surface 124c of the inner barrel 124 (the second portion 130b may otherwise be identical to that described in previous embodiments).

A second joining frame 138 connects the additional acoustic treatment section 134 to the lip skin 118. A first portion 138a of the second joining frame 138 may overlap a radially outer portion of the acoustically treated section such that it extends over the sound attenuating sheet 135 and is fixed to the radially outer structural sheet 134b. A second portion 138b of the second joining frame 138 may overlap a portion of the lip skin 118 and thereby be fixed to the lip skin 118. A third portion 138c of the second joining frame 138 may extend over an end surface 134c of the acoustically treated section 134. As shown in FIG. 9, the second joining frame 138 is positioned at a forward end of the acoustically treated section 134, opposite the end adjacent to the inner barrel 134.

Figure 10:
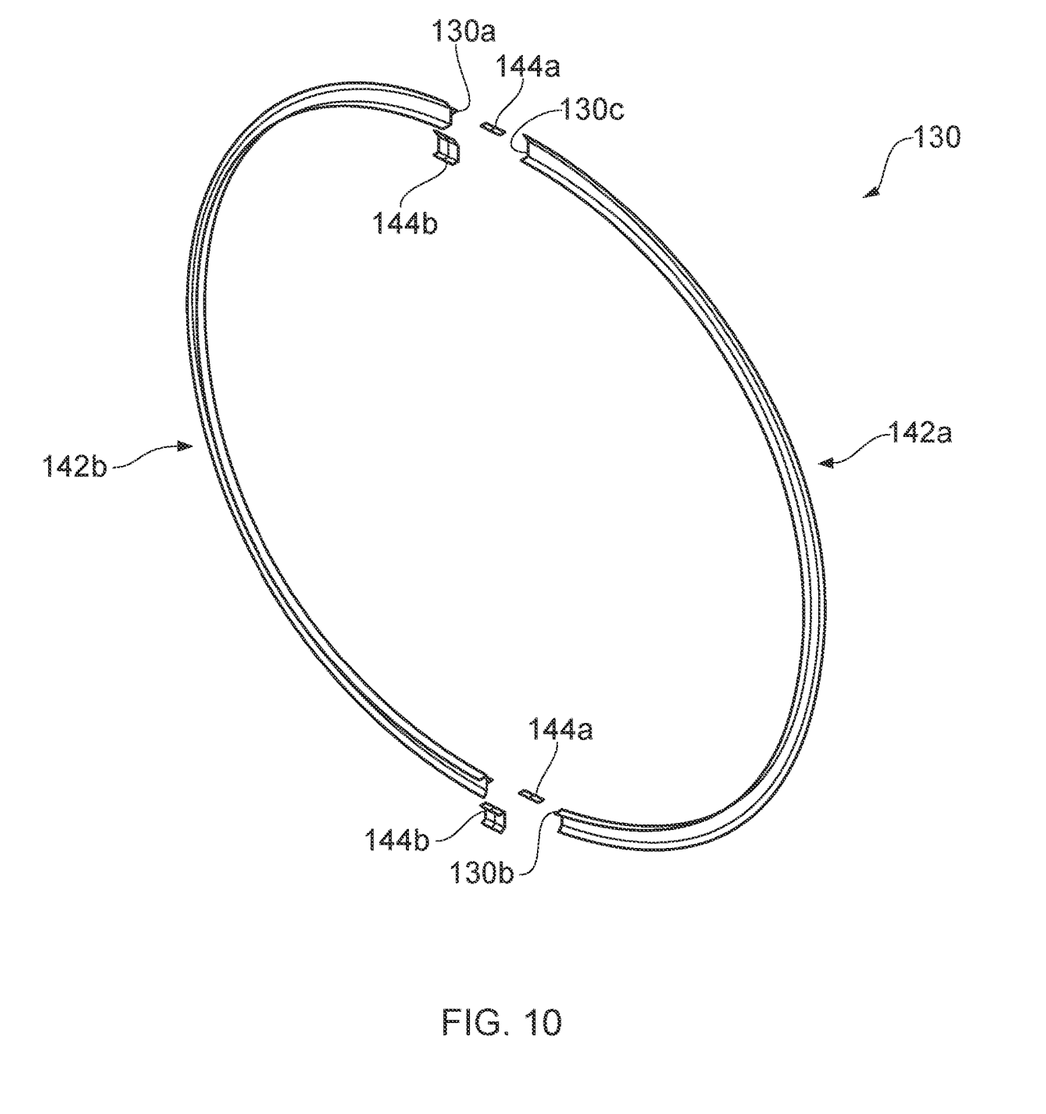
FIG. 10 shows a joining frame according to the invention.

FIG. 10 shows the joining frame 130. Although the illustrated joining frame 130 corresponds to the cross-section shown in FIG. 7, this concept is applicable to any of the embodiments discussed above, and to the second joining frame 138 of FIG. 9. The joining frame 130 is a substantially circular component which may be a single piece or may be formed of multiple pieces, for example two annular portions 142a, 142b which may be connected via shorter connecting pieces 144a, 144b.

The joining frame described in any of the above embodiments has the advantage of improving the transfer of loads between the inner barrel and lip skin and/or forward bulkhead. In any of the embodiments described above, the connection between the joining frame 130 and any other element of the nacelle may be by means of mechanical fasteners and/or splice plates, or using any other method known to the skilled person, such as welding or adhesive bonding.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An air inlet for an aircraft nacelle, the air inlet comprising:
   a lip skin defining a curved surface of the inlet, the curved surface extending about a longitudinal axis of the inlet;
   a forward bulkhead;
   an inner barrel having a radially inner surface defining a surface of the inlet, a radially outer surface, and a sound attenuating layer arranged between the radially inner and radially outer surfaces; and
   a joining frame fixed to the lip skin and/or to the forward bulkhead;
   wherein a first portion of the joining frame extends over at least a portion of the sound attenuating layer of the inner barrel and is fixed to the radially outer surface of the inner barrel,
   wherein a second portion of the joining frame is substantially perpendicular to the first portion and defines a flat surface extending over an end surface of the inner barrel,
   wherein the joining frame further comprises a third portion, the third portion extending over at least a portion of the forward bulkhead, and
   wherein the third portion extends from the first portion and the second portion,
   wherein the joining frame is Y-shaped as viewed in cross-section, and the first, second and third portions of the joining frame respectively constitute three different legs of the Y-shape.

2. The air inlet of claim 1, wherein the inner barrel has an end surface substantially perpendicular to at least one of the radially outer surface and the radially inner surface.

3. The air inlet of claim 1, wherein the joining frame further comprises a fourth portion, the fourth portion being a joining frame curved surface extending over at least a portion of the lip skin.

4. The air inlet of claim 3, wherein the first portion of the joining frame is formed integrally with at least one of the second, third, and fourth portions.

5. The air inlet of claim 1, wherein the lip skin has a flat surface extending radially outwardly from the curved surface and at least a portion of the flat surface of the lip skin overlaps the joining frame.

6. The air inlet of claim 1, wherein the lip skin and the bulkhead together define a compartment.

7. The air inlet of claim 1, wherein the lip skin comprises a structural sheet defining the curved surface and a lip skin sound attenuating layer arranged on a radially outer side of the structural sheet.

8. The air inlet of claim 7, wherein the lip skin further comprises a further structural sheet on a radially outer surface of the lip skin sound attenuating layer, the further structural sheet being fixed to the joining frame.

9. The air inlet of claim 8, further comprising a second joining frame, the second joining frame being coupled to the further structural sheet and to the structural sheet of the lip skin.

10. The air inlet of claim 9, wherein at least one of the joining frame and the second joining frame is annular.

11. The air inlet of claim 10, wherein at least one of the joining frame and the second joining frame is formed of multiple parts, each part being a sector of an annulus.

12. The air inlet of claim 11, further comprising ventilation holes through the lip skin, the ventilation holes arranged forward of the joining frame and configured to vent hot gas for heating a radially inner surface of the inlet.

13. The air inlet of claim 1, wherein the inner barrel comprises a radially inner structural sheet defining the radially inner surface and a radially outer structural sheet defining the radially outer surface, the sound attenuating layer being disposed between the radially inner and radially outer structural sheets.

14. An aircraft nacelle comprising:
   a fan casing; and
   an air inlet secured to the fan casing and comprising:
      a lip skin defining a curved surface of the inlet, the curved surface extending about a longitudinal axis of the inlet;
      a forward bulkhead;
      an inner barrel having a radially inner surface defining a surface of the inlet, a radially outer surface, and a sound attenuating layer arranged between the radially inner and radially outer surfaces; and a joining frame fixed to the lip skin and/or to the forward bulkhead;

wherein a first portion of the joining frame extends over at least a portion of the sound attenuating layer of the inner barrel and is fixed to the radially outer surface of the inner barrel, wherein a second portion of the joining frame is substantially perpendicular to the first portion and defines a flat surface extending over an end surface of the inner barrel, wherein the joining frame further comprises a third portion, the third portion extending over at least a portion of the forward bulkhead, and wherein the third portion extends from the first portion and the second portion, wherein the joining frame is Y-shaped as viewed in cross-section, and the first, second and third portions of the joining frame respectively constitute three different legs of the Y-shape.

15. The air inlet of claim 10, wherein at least one of the joining frame and the second joining frame is formed of two semi-annular parts, each semi-annular part being a sector of an annulus.

* * * * *